Figure 1:
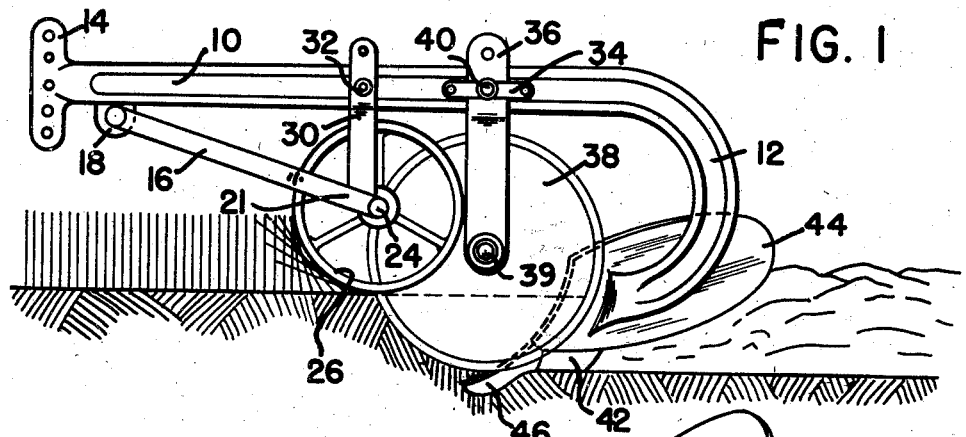

April 20, 1948. M. HOWARD 2,440,174

PLOWING MECHANISM

Filed Dec. 18, 1944

MICHAEL HOWARD
INVENTOR

BY *Herbert E. Smith*

ATTORNEY

Patented Apr. 20, 1948

2,440,174

UNITED STATES PATENT OFFICE 2,440,174

PLOWING MECHANISM

Michael Howard, Davenport, Wash.

Application December 18, 1944, Serial No. 568,617

2 Claims. (Cl. 97—3)

My invention relates to improvements in a plowing mechanism useful in preparing the ground surface for planting and cultivation.

An important object of my invention is the provision of a plowing mechanism which will operate with decreased power requirement than is now necessary with the conventional plow, and with increased efficiency under difficult conditions that must be met in the field.

Another object of my invention is the provision in a plow having a plow beam, a colter and pressure producing ground-engaging members that travel over the earth surface in advance of the plow and colter to assist in the plowing operation and, under certain conditions, to support the plow in a fixed position as to depth of penetration that is to be permitted.

A further object of the invention is the provision of rollers for engaging the ground and that are drawn over the ground surface in advance of a plow and a colter, which rollers are journaled in end to end relation but spaced apart from each other so that a forward portion of the colter rolls between the rollers.

Another object of the invention is the use in combination with a colter and ground-engaging means of a land-sideless plow having an edged but bottomless plowshare and a conventional mold board cooperating therewith, the functions of the omitted features of the conventional plow being performed by other suitable but more satisfactory means.

Other objects and advantages of the invention will be apparent during the course of the following description wherein I set forth a preferred form of my invention.

Figures 2, 3:
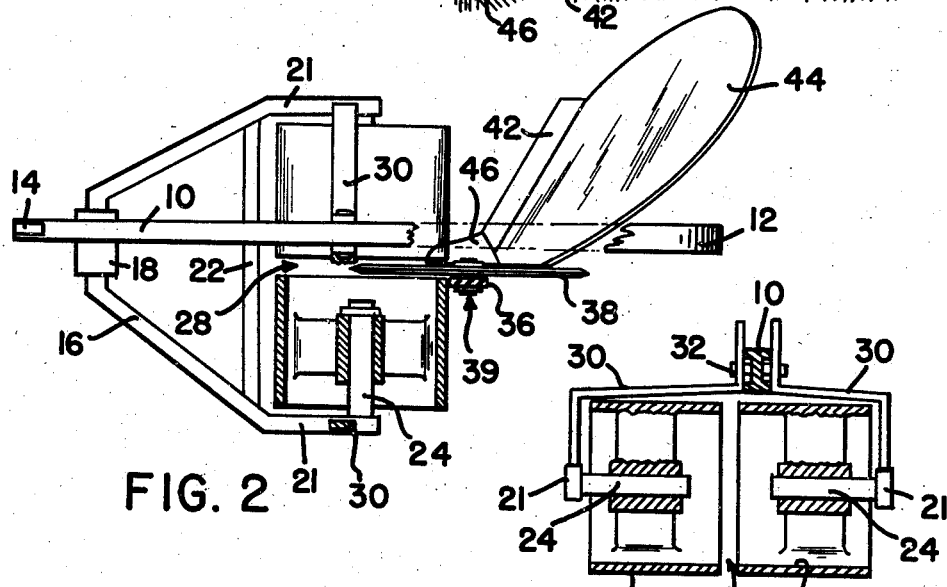
Figure 4:
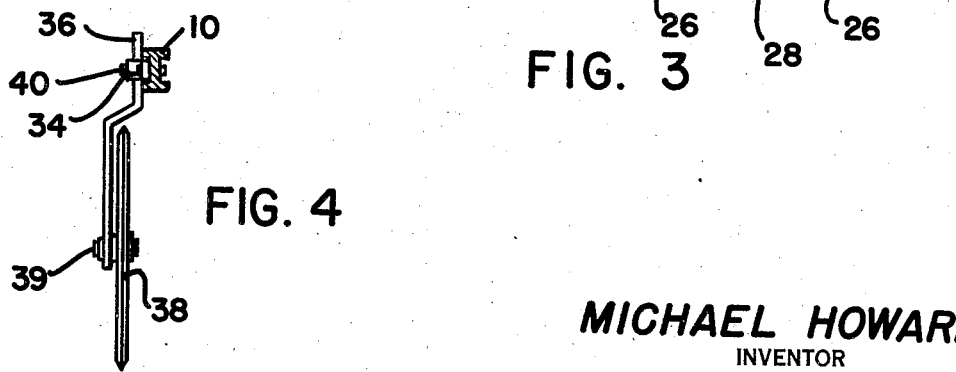

In the drawings:

Figure 1 is a side elevational view of the assembled structure of my following mechanism, Figure 2 is a plan view of the device of Figure 1 with portions broken away for convenience of illustration, Figure 3 is a vertical sectional view taken on a vertical line through the axes of the rollers and looking forward, and Figure 4 is an edge view of the rolling colter employed in my invention.

In the drawings wherein like reference numerals refer to like parts throughout the same, the numeral 10 designates the plow beam having a curved rear end 12 and forward draft attachment means 14 which is provided with a plurality of holes for variously adjusting the attachment of the plow beam to a draft mechanism. Mounted below the plow beam, under its forward end, is a trailing tongue 16 which can be seen in Figure 2 to include a hitch member 18 forming a journal. The tongue comprises a pair of forked arms that trail rearwardly and divergently from the member 18 to a point where they are provided with rearwardly extending arms 21, 21 that lie substantially parallel to each other.

Arms 21, 21 which are braced apart by means of the cross-brace 22, carry the shafts 24, 24, each of which carries a roller or ground-engaging member 26. Ground-engaging members 26 are mounted in end to end alignment but spaced apart as indicated at 28 for a purpose later to be described.

In the sectional view through the ground-engaging members I have indicated that each of the arms 21, 21 of the bifurcated tongue has riding above its rear end, a supporting leg 30, 30 which join each other above the ground-engaging members to be secured to the beam 10, where they may be pinned in position by a bolt or other suitable pin 32 to fix the distance between the tongue of the ground-engaging member and the beam 10.

To the rear of the ground-engaging member I provide a U-shaped clip 34 on the beam 10 in which slides the arm 36. Arm 36 has journaled at 39 the rolling colter 38. A pin 40 retains the arm 36 in the clip 34 in adjusted position. Ordinarily the forward portion of the colter is inserted into the space 28 between the ground-engaging members so that the cutting edge of the colter enters the earth adjacent the earth-engaging point of each of the rolls or ground-engaging members.

On the rear curve, or hook end 12 of the plow beam I mount a plow which is provided with the plowshare 42, mold board 44, and plow point 46. In certain installations a plowshare 42 is bottomless and its underside merely terminates in the relatively sharp cutting edge that is formed on the upperface. Under conditions I prefer that the plow be devoid of a land-side and that the moldboard merely terminate in a thin edge where a landside would be customarily provided on the plow.

The plow is so positioned with relation to the colter 38 that its land-sideless edge lies along a side of the colter in relatively close proximity in a manner that can be clearly seen in Figure 2.

In operation the relation between the ground engaging members 26 and the plow beam 10 is determined by the set of the spacer members 30 and the depth of penetration of the plow is governed thereby.

As the ground-engaging members pass over the surface of the earth they will tramp down or press down all vegetation thereon as suggested in Figure 1, wherein stubble is shown as being rolled down. The colter 38, in the space 28 between the members 26, will enter the ground and make a narrow or thin cut in the earth and also through such debris as may be on the surface. This operation is facilitated by the fact that the ground-engaging members at the point of contact with the earth are tightly pressing the earth and the vegetation thereon. The colter knife enters the ground adjacent that point where the vegetation is most tightly pressed to the earth.

As the plow progresses through the ground, the earth that has been cut by the colter is cut underneath by the plow point 46 and the plow-share 42 and is turned by the moldboard in the conventional manner leaving the usual type of furrow that is most desired.

An important and valuable function of my plow is the fact that the drift tendency of the plow need not be resisted by a landside and a plow bottom, but is overcome by the ground-engaging members 26 in advance thereof on the upper portion of the earth's surface, and the colter 38. The sole function of the plow in this invention is to cut a strip of earth and to turn it to one side of its furrow. Thus is eliminated the formation of "plow-pads" and "hardpan" which is an undesirable condition in plowing due to the conventional plow now used with its landside and bottom.

A great amount of erosion occurs where the earth is packed so hard that moisture cannot enter and must run off the hard surface carrying with it top soil and valuable earth. This is due to the "plow-pad" being largely impervious to the moisture because it is packed so hard. To eliminate the formation of this very undesirable condition is an important object of my invention.

Having thus described my invention, I claim:

1. Plowing mechanism comprising a plow beam having an end-to-end pair of spaced apart pressure rollers journalled thereunder, said rollers comprising elongated cylinders with their adjacent ends in close proximity to each other, means connecting the rollers to the beam and positioning said rollers at a predetermined level below said beam, a rolling colter secured to said beam and having a portion positioned between said rollers, a plowshare and a moldboard secured on said beam with their forward vertical edges in juxtaposition to the colter whereby the colter serves as a land side therefor and the rollers provide a support to limit the depth to which the plow share can enter the ground.

2. Plowing mechanism comprising a plow beam having a trailing tongue mounted thereunder, spacer means between said beam and tongue, a pair of rollers journalled for rotation on said tongue, said rollers comprising elongated cylindrical ground engaging portions, the adjacent ends of which are in close proximity to each other, a rolling colter carried by the plow beam with its forward portion partially disposed between the adjacent ends of said rollers so that its cutting edge enters the soil approximately at the line of engagement of the rollers with the earth, and a plow carried by said beam and overlapping the colter whereby the colter forms a landside for the plow.

MICHAEL HOWARD.

REFERENCES CITED

The following references are of record in the file of this patent:

UNITED STATES PATENTS

| Number | Name | Date |
| --- | --- | --- |
| 153,620 | Shemwell | July 28, 1874 |
| 209,175 | Lane | Oct. 22, 1878 |
| 251,357 | Goddard | Dec. 27, 1881 |
| 304,616 | Clayton | Sept. 2, 1884 |
| 325,749 | Knowles | Sept. 8, 1885 |
| 798,875 | Cone | Sept. 5, 1905 |
| 1,180,456 | Wahl | Apr. 25, 1916 |
| 1,762,258 | Chenoweth et al. | June 10, 1930 |

FOREIGN PATENTS

| Number | Country | Date |
| --- | --- | --- |
| 52,579 | Germany | July 2, 1890 |